United States Patent [19]

Erickson

[11] 4,126,668

[45] Nov. 21, 1978

[54] PRODUCTION OF HYDROGEN RICH GAS BY COMBINED STEAM REFORMING AND INTERMEDIATE OXIDATION-REDUCTION

[76] Inventor: Donald C. Erickson, 1704 S. Harbor La., Annapolis, Md. 21401

[21] Appl. No.: 580,284

[22] Filed: May 23, 1975

[51] Int. Cl.$^2$ .......................... C01B 1/02; C01B 1/08
[52] U.S. Cl. ................................... 423/657; 252/373; 423/359; 423/658
[58] Field of Search ............... 423/655, 657, 658, 650, 423/437, 359; 252/373

[56] References Cited

U.S. PATENT DOCUMENTS

| | | | |
|---|---|---|---|
| 1,202,995 | 10/1916 | Haber et al. | 423/359 |
| 1,376,514 | 5/1921 | Clancy | 423/437 |
| 1,830,167 | 11/1931 | Jones | 423/359 X |
| 1,849,357 | 3/1932 | Pyzel | 423/359 |
| 2,955,909 | 10/1960 | Clarke | 423/655 X |
| 3,442,619 | 5/1969 | Huebler et al. | 423/658 |
| 3,539,292 | 11/1970 | Huebler et al. | 423/359 |
| 3,576,603 | 4/1971 | Smith et al. | 423/655 X |
| 3,619,142 | 11/1971 | Johnson et al. | 423/658 |
| 3,821,362 | 6/1974 | Spacil | 423/618 X |
| 3,880,987 | 4/1975 | Nahas | 423/618 X |

OTHER PUBLICATIONS

McPherson & Henderson book "A Course in General Chem.", Third Ed., 1927, pp. 140, 141, Ginn & Co., N.Y.

Primary Examiner—Edward J. Meros

[57] ABSTRACT

A hydrogen rich gas such as pure hydrogen, ammonia synthesis gas, or methanol synthesis gas is generated by reacting steam with a nongaseous intermediate, whereby some of the steam is reduced to hydrogen and some of the intermediate is oxidized. Carbon dioxide may be added to or substituted for the steam, whereby carbon monoxide is produced in addition to or in lieu of $H_2$. The oxidized intermediate is reduced by a reducing gas. The reducing gas is generated by partially reforming a light hydrocarbon such as natural gas or naphtha with steam and/or $CO_2$, and then partially oxidizing the partially reformed gas with air. The low BTU exhaust gas resulting after reduction of intermediate oxide is used as fuel for the primary reformer. When ammonia synthesis gas is produced by this process, the purge and flash gases from the ammonia synthesis loop are added to the reducing gas.

12 Claims, 1 Drawing Figure

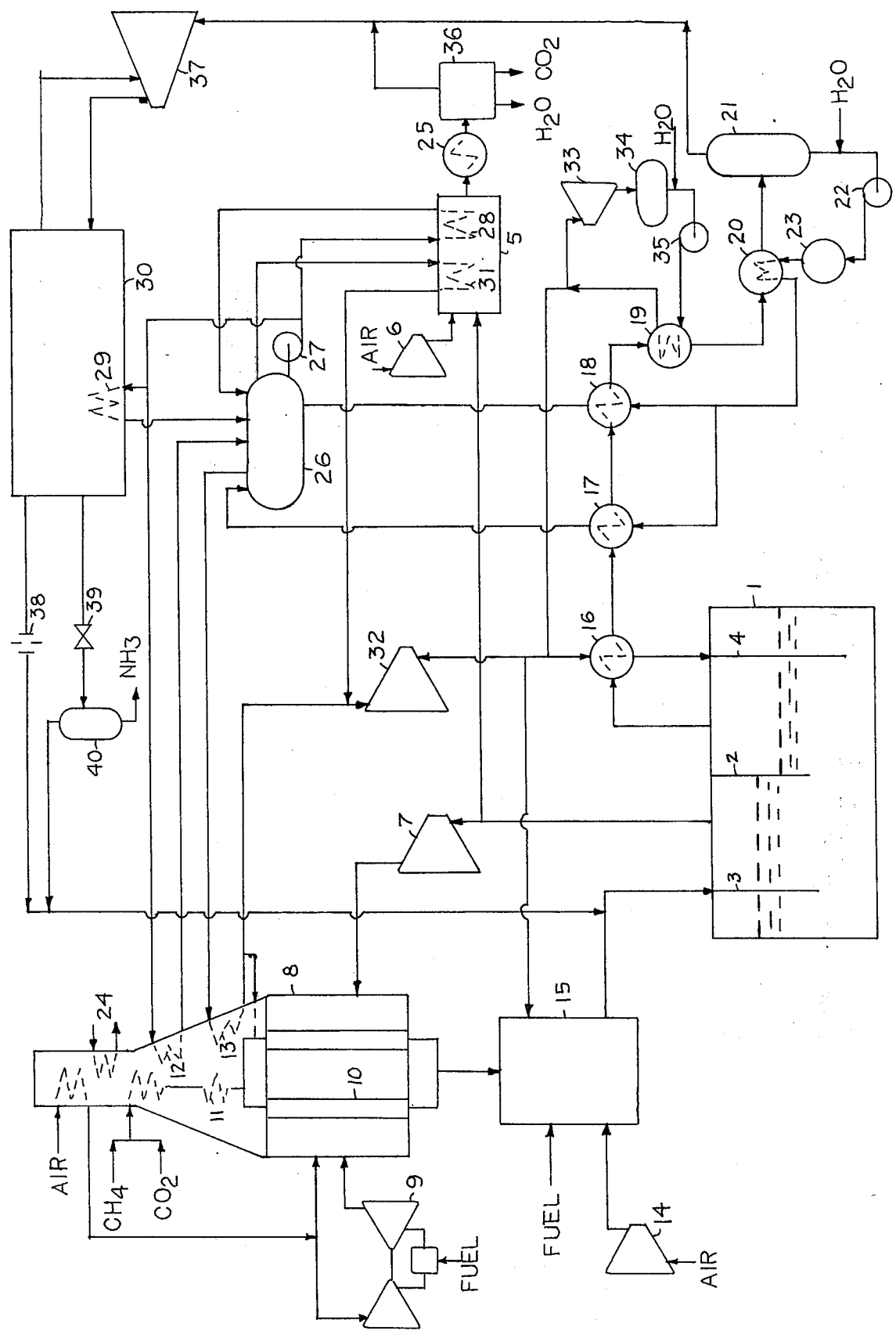

PRODUCTION OF HYDROGEN RICH GAS BY COMBINED STEAM REFORMING AND INTERMEDIATE OXIDATION-REDUCTION

CROSS REFERENCE TO RELATED APPLICATIONS

The general category of hydrogen producing processes termed intermediate oxidation-reduction is defined and described in copending applications all filed by D. C. Erickson on Mar. 21, 1975. Application Ser. No. 560,341 describes the advantages to be obtained from use of liquid intermediates such as tin, included preferred operating conditions. Application Ser. No. 560,342 describes the advantages and techniques of multistaging the oxidation and reduction reactions, and application Ser. No. 560,965 describes the advantages and techniques of batch operation with the oxidation reaction at higher pressure than the reduction reaction. All of those concepts may be applied advantageously to the present teachings, and are incorporated herein by reference. Those applications define an intermediate essentially as a condensed phase substance which in the presence of its condensed phase oxide establishes an equilibrium $pH_2/pH_2O$ value of between 0.5 and 10, at some temperature in the range of 700° K. to 1300° K., and that definition is incorporated in this specification including the claims.

BACKGROUND OF THE INVENTION

The field of art of this invention is the one encompassing processes in which a hydrogen rich gas is produced by a chemical reaction between water in any state and a metal or metallic compound. The field is further defined in that the metal or metallic compound which is consumed (i.e. oxidized) in the above reaction is regenerated by reaction with a carbonaceous reducing gas. Thus the metal or metallic compound is an intermediate, not being consumed in the process. Also included are those processes which form either hydrogen or a reducing gas by reacting a carbonaceous feedstock such as light hydrocarbons with steam in a reformer.

Typical prior art related to this field of invention is described in U.S. Pats. Nos. 3,539,292, 3,821,362, and 3,441,393.

Some of the problems existing in the prior art practice of this field of invention are as follows.

Heretofore, processes using intermediate oxidation reduction to produce hydrogen rich gas, such as the steam iron process, have used a simple air blown partial combustion furnace to generate the required reducing gas. This capability of converting a reducing gas with high nitrogen content into high purity hydrogen has been considered the main advantage of the intermediate oxidation-reduction type of process, as it eliminates the need for either expensive pure oxygen, or for expensive steam reformers which can only use gaseous hydrocarbons or naphtha as feedstock. However two disadvantages have attended the intermediate oxidation reduction processes. First, there is always a considerable quantity of both chemical and thermal energy energy left in the exhaust reducing gas. Secondly, when the nitrogen content of the reducing gas becomes large, several penalties accrue: in elevated pressure systems, compression costs go up; additional losses of thermal energy occur due to heating the extra nitrogen, and process equipment has to be sized larger. Thus it can be seen that the intermediate oxidation reduction type of process would yield improved results if the energy of the exhaust reducing gas could be converted into additional reducing gas and if the nitrogen content of the reducing gas could be decreased.

Conventional steam reforming processes for production of hydrogen rich gas involve a complex train of high technology, high cost equipment: a large catalytic primary reformer, one or two catalytic shift converters, a $CO_2$ removal system, and a catalytic methanator. The efficiency of converting fuel to hydrogen in these processes is generally less than 65%, owing to the following problems: large amounts of heat must be supplied to the primary reformer at temperatures greater than 1150° K., creating substantial amounts of high temperature exhaust gas. Approximately three times as much steam as the stoichiometric requirement must be fed to the reformer in order to achieve desired equilibrium conditions, i.e. reasonably complete conversion of the hydrocarbon, thereby adding substantially to the heat load. The energy released by the exothermic shift reaction is at such a low temperature that little can be recovered in useful form.

Thus the steam reforming processes could yield improved results if it were possible to decrease the proportion of steam fed to the primary reformer, decrease the necessary degree of hydrocarbon conversion and heat load of the primary reformer (given that the same amount of reducing gas is generated), and eliminate or decrease the size of the various purification units.

By combining the most advantageous features of both the steam reforming process and the intermediate oxidation reduction process, it has been discovered that all of the above mentioned improvements can be achieved.

Other problems existing in the prior art are that appreciable quantities of ammonia synthesis gas which are dissolved in high pressure liquid ammonia and which come out of solution when the pressure is decreased are either vented or merely used as process fuel, thereby not efficiently recovering their energy content.

OBJECTS OF THE INVENTION

It is a general object of this invention to increase the efficiency at which a hydrogen rich gas can be generated using economical process equipment. It is also an object to combine the most advantageous features of the intermediate oxidation-reduction process and the steam reforming process to yield a heretofore unexpected improved process.

More specific objects are to utilize the energy content of the exhaust reducing gas from the intermediate oxidation reduction process to increase the efficiency of generating hydrogen rich gas; to utilize the exhaust reducing gas as fuel for a primary reformer; to decrease the nitrogen content of the reducing gas without necessitating the use of pure or enriched oxygen; to provide a process for generatng hydrogen rich gas which uses a steam reformer and: (a) which is operable over a wide range of pressures, (b) in which the hydrogen generation rate is not directly dependent on the instantaneous reforming rate, (c) the reformer is of lower duty rating and most downstream gas purification units are eliminated, compared to existing reforming processes; to provide a means of efficiently recovering the energy content of flash gases coming out of solution from liquids such as ammonia or methanol.

BRIEF DESCRIPTION OF THE DRAWING

The FIGURE is a flow sheet diagram of one possible embodiment of the disclosed process, in which the hydrogen rich gas being generated is ammonia synthesis gas. The diagram illustrates the entire integrated ammonia synthesis operation, in order to illustrate interrelations between the synthesis gas generation system and the ammonia synthesis loop, such as generation of nitrogen, developing power for compression and steam for oxidation by using waste heat from the synthesis loop among other sources, and recovering the chemical energy of purge and flash gases by recycling them into the reducing gas. Generation of other hydrogen rich gases would obviously not require all these refinements.

DETAILED DESCRIPTION OF THE INVENTION

In its simplest embodiment, this process consists of a conventional intermediate oxidation-reduction process, wherein steam is reacted with the intermediate in an oxidizer or oxidation zone, producing intermediate oxide and a gaseous mixture of hydrogen and steam which is removed from the oxidizer or oxidation zone, and the intermediate oxide is reduced by a reducing gas in a reductor. The novel combination which yields advantageous results is the method of producing the reducing gas wherein the exhaust reducing gas efficiently contributes to the generation of additional reducing gas. This is accomplished by partially reforming the light hydrocarbon feedstock with steam in a primary reformer fueled by the exhaust reducing gas, and then further reacting the partially reformed gas to reducing gas in an air blown partial oxidizer, also called a partial combustion furnace or secondary reformer.

This approach results in substantial improvements in economy and efficiency for several reasons including the following. First, since only approximately one half or less of the hydrocarbon feedstock is reformed in the primary reformer, the heat load and duty of that component is only one half of what it would be in a similarly sized steam reforming hydrogen plant, or two thirds of what it would be in a steam reforming ammonia synthesis gas plant. The steam gas ratio can be kept at or near the stoichiometric value, further decreasing the heat load on the primary reformer.

Secondly, the hydrogen produced in the oxidizer, after condensing out the unreacted steam, is of high purity, virtually eliminating the need for downstream purification. Great savings in both capital cost and in process energy are realized by eliminating the $CO_2$ scrubber, the shift converter, and the methanator. This has added importance in synthesis processes such as ammonia synthesis: a decreased amount of inert $CH_4$ in the synthesis makeup gas decreases the requirements for purge.

A third advantage of the combined process has already been alluded to — the decreased content of nitrogen in the reducing gas decreases compression requirements, decreases heat losses in final exhaust, and decreases equipment size requirements. It also decreases slightly any possible loss of intermediate as gaseous suboxide or sulfide.

Another advantage gained is an operational one: the inventory of intermediate acts as a reservoir or surge tank between the reducing gas generation side and hydrogen generation side of the process, allowing temporary imbalances between the two. In a conventional reforming ammonia plant, all feedstock entering the reformer follows a direct single train into the synthesis loop. Thus slight disturbances anywhere in the train or loop propagate immediately, and frequently unsteady behavior results. The reservoir of intermediate in effect decouples the two parts of the plant, making such an upset less likely.

Overall, the superior economy of utilization of waste heat possible in the combined plant increases the realizable efficiency from approximately 62% for either plant taken separately to over 70% for the combined plant, as illustrated by the drawing. There are various reasons why this combination would not have been anticipated in the prior art. First of all, there has been no basis for interest in the use of light hydrocarbons as fuel for the usual intermediate oxidation-reduction process, in which the reducing gas is generated by partial combustion of the fuel in air. This is because a simple heat and mass balance shows that efficiencies achievable are no better than what is already achievable in reforming plants. Thus the interest in intermediate oxidation-reduction has focused on its capability to generate hydrogen efficiently from coal and heavy oil without the expense of pure oxygen. Secondly, the primary reforming processes and the intermediate oxidation-reduction processes have heretofore been regarded as alternate, competitive processes. The combination process disclosed herein requires conceptualizing each process in a somewhat different role from its traditional one: the primary reformer fulfills the role of a reducing gas generator, rather than a generator of hydrogen synthesis gas (which has much more stringent requirements on allowable impurities); or alternatively, the intermediate oxidation-reduction process is fulfilling the role of gas purification in lieu of gas generation, doing in effect what the combined shift converter, $CO_2$ scrubber, and methanator do in a conventional reforming plant.

Various modifications and refinements can be made to this concept to achieve even more advantageous results depending upon the particular application. Most of these are well known to those skilled in the art; a few of the less obvious and particularly advantageous refinements are here described. First, it is possible to introduce supplemental fuel or feedstock at alternate locations in the process, thereby reducing requirements for the light hydrocarbon feedstock. Extra fuel can be injected into the secondary reformer, decreasing the amount of $CH_4$ or naphtha which must be input to the primary reformer for a given quantity of reducing gas. Alternatively, extra fuel can supplement the low BTU exhaust used to heat the primary reformer. In this case less reducing gas is required, since the lower energy content of the low BTU exhaust means more of it was used for reducing intermediate oxide. Supplementary fuel could be introduced at both locations simultaneously. The major advantage from using supplementary fuel is that it is not limited to the scarce hydrocarbons such as natural gas and naphtha, but can also be heavy oil, residual oil, etc., and also can have substantial fractions of impurities such as sulfur without detriment to the system.

A modification related to the preceding is the substitution of $CO_2$ for some or all of the $H_2O$ supplied to the primary reformer. This has the effect of increasing the conversion level of the $CH_4$ (or other feedstock) by decreasing the relative content of hydrogen in the reformer effluent gas. Increased percentage conversion means that less feedstock has to be fed to the primary reformer for the same heat loading, and consequently more alternate fuel can be used in the secondary reformer. Alternatively, reformer pressure can be increased while still achieving the desired degree of feedstock conversion. Of course the $CO_2$ proportion in the feed cannot be increased to the point where the Bouduard reaction will result in carbon laydown on the catalyst, which point will vary with process conditions.

Another possible modification is to dispense with the secondary reformer as a separate item of process equipment, and have the secondary reforming reactions occur simultaneously with the reduction reactions in the reductor. That is, the partially reformed gas, partial combustion air, plus supplementary fuel as appropriate are introduced directly into the reduction zone containing intermediate oxide. Since $CH_4$ is less reactive than CO or $H_2$, this approach requires a hotter or more reactive intermediate than when a separate secondary reformer is incorporated, in order to achieve a sufficient extent of reaction of the $CH_4$.

It would be within the scope of this invention to substitute pure or enriched oxygen for air wherever air is mentioned.

When $CO_2$ is employed according to the preceding teachings, it is conveniently derived from part of the final exhaust gas, assuming an alternative economic source is not available. When $CO_2$ is removed from the exhaust gas by scrubbing, and the water vapor is condensed out, fairly high purity nitrogen remains, which can be used to advantage in forming ammonia synthesis gas.

When the hydrogen rich gas being produced by this process is desired to be a mixture of hydrogen and carbon monoxide, as for example in a methanol synthesis process, two approaches can be used to generate such a mixture. First, appropriate amounts of $CO_2$ could be added to the steam being supplied to the oxidizer, whereby $CO_2$ is reduced to CO concurrently with $H_2O$ reduction to $H_2$. An alternate approach is to first generate high purity hydrogen, and then react it with $CO_2$ in a separate reactor in which the reverse water gas shift reaction occurs.

The drawing is a flow sheet illustrating one embodiment of this invention as it could be applied for the purpose of producing ammonia. The flow sheet reflects fairly concise material and energy balance values, since energy management efficiency is the key to overall process efficiency, and a full demonstration of energy management is the only way a claim to increased efficiency can be made credible. The basis for the flow sheet is 1000 tons/day of anhydrous ammonia. All material flows are indicated in units of lb.-moles/-hour(MPH), energy flows (i.e. power ratings) are in units of megawatts (MW), pressures are in bars, and temperatures in degrees Kelvin. The molar composition of air is assumed to be 21% oxygen, 0.93% argon, and balance nitrogen. The flow sheet reflects several optional features, such as the method of obtaining nitrogen by combusting part of the exhaust reducing gas and then scrubbing out $CO_2$, and the generation of additional horsepower in a supplemental gas turbine whose exhaust furnishes both heat and combustion air to the primary reformer.

The flow sheet reflects a nominal pressure of 30 bars in order to retain maximum comparability and commonality to existing processes and equipment. However the process is not as constrained to that pressure as current systems are, because the reforming reactin can be substantially more incomplete.

The flow sheet schematically depicts the use of molten tin as intermediate, slurried with finely divided solid $SnO_2$. The tin is preferably catalyzed, as for example by adding approximately 3% indium to the melt. Tin is the generally preferred intermediate in single stage embodiments, since it has the most desirable equilibrium $pH_2/pH_2O$ value (0.33 at 1100° K.), and compared to solid intermediates it is easier to handle and transport and yields a higher purity hydrogen product. However other known intermediates such as iron, wustite, tungsten dioxide, tungsten, molybdenum, germanium, indium, etc. can also be used, making suitable flow sheet modifications.

The central element of the process is the container 1 wherein the intermediate is oxidized and the intermediate oxide is reduced. The reduction and oxidation zones are separated by baffle 2, although alternate means of separation such as separate containers could be used. 17224 MPH of reducing gas of the composition B shown in the table is injected into contact with intermediate oxide via means for injection 3, and the oxidizing gas, comprised of 30760 MPH steam, is injected into contact with intermediate via means of injection 4. 40 MW of reaction heat is released in the oxidizer; 30 MW is absorbed by heating the steam from 900° K. to 1100° K., and 10 MW heats the melt. 30 MW reaction heat is absorbed in the reductor, 20 MW being supplied by cooling the reducing gas from 1375° K. to 1100° K., and the other 10 MW from the melt. The reducing gas entering the reductor is 81% quality, and that exiting is 26% quality, i.e. the equilibrium composition. The exiting or exhaust reducing gas has composition C of the Table.

Approximately one fourth of the exhaust reducing gas, at a pressure of 27 bar, is routed to a combustion furnace 5, wherein it is combusted with stoichiometric air (2143 MPH) supplied at 28 bar by 5000 hp compressor 6, and is subsequently scrubbed of $CO_2$ by $CO_2$ scrubber 36 to yield 2363 MPH nitrogen including 40 MPH inerts (mostly argon). 38 MW of thermal energy above 600° K. is released in the combustion furnace, The $CO_2$ scrubber removes 800 MPH of $CO_2$ and condenses 2630 MPH of $H_2O$ from the gaseous stream.

The remainder of the exhaust reducing gas is expanded through turbo-expander 7 to a pressure of approximately 2.5 bars in order to recover 16,000 hp of mechanical energy, and then introduced as fuel into primary reformer 8. All turbo-expanders and compressors depicted in the flow sheet operate at 70% isentropic efficiency.

The fuel is completely combusted with 6380 MPH air, 1920 MPH being supplied by the exhaust from 3000 hp gas turbine 9. This combustion plus the gas turbine exhaust releases 111 MW of thermal energy above 600° K. in the primary reformer, which is used as follows: the endothermic reforming reaction in catalyst tubes 10 receives 47 MW, thereby converting the thermal energy to chemical energy of the fuel gas or partially reformed gas; preheating 3190 MPH $CH_4$ in heat exchanger 11 from 600° K. to 1180° K. absorbs 15 MW; evaporating 8015 MPH of 120 bar water into steam at 590° K. in heat exchanger 12 absorbs 21.2 MW, and superheating 14935 MPH steam from 590° K. to 800° K. in heat exchanger 13 absorbs 26 MW.

The 3190 MPH $CH_4$ feed, combined with steam at a steam gas ratio of 1, is 55% reformed in the primary reformer at a pressure of 33 bars and temperature of 1180° K., yielding a gas of composition A in the table, and then partially combusted with 4390 MPH air supplied by 10,900 hp compressor 14 and 630 MPH steam in secondary reformer 15. The 16724 MPH of reducing gas resulting, of composition B in the table, is combined with 500 MPH of purge and flash gases from the ammonia synthesis loop. The purge and flash gases consist of 345 MPH hydrogen, 115 MPH nitrogen, and 40 MPH inerts.

The gas exiting the oxidation side of container 1, consisting of 7690 MPH $H_2$ and 23070 MPH $H_2O$ at 1100° K., is cooled to 830° K. in heat exchanger 16, delivering 38 MW to the incoming steam; then cooled to 630° K. in heat exchanger 17, delivering 30 MW which heats and evaporates 10670 MPH of 545° K. water into 590° K. steam; then cooled to 590° K. in heat exchanger 18 which heats 20925 MPH of water from 545° K. to 590° K.; and then is cooled to 500° K. in heat exchanger 19 delivering 12 MW to a medium pressure (31 bar) steam system by heating and evaporating 3650 MPH of steam. The hydrogen-steam mixture is further cooled and condensed in heat exchangers such as 20, and then separated into gas and liquid phases by separator/condenser 21. 23040 MPH of $H_2O$ condensate at 25 bars is combined with 8910 MPH of makeup feedwater to supply boiler feed pump 22, which increases the pressure to 121 bars. The feedwater is preheated in numerous waste heat heat exchangers, not all shown, such as 20, 23, 24, 25, to a temperature of 545° K., and then directed to heat exchangers 17 and 18, previously described, and thence to boiler 26. The waste heat exchangers also generate steam for use in the $CO_2$ scrubber. Boiler circulating pump 27 directs boiler water to three boiling heat exchangers: 3300 MPH to exchanger 28, absobing 9 MW; 9610 MPH to exchanger 29, absorbing 26 MW; and 8015 MPH to exchanger 12, absorbing 21.2 MW. The 26 MW absorbed from the ammonia synthesis loop 30 (heat exchanger 29) is approximately 95% of the exothermic reaction heat released by ammonia synthesis, the remainder being losses. Steam from boiler 26 is superheated to 800° K. in two heat exchanges: 16,660 MPH in heat exchanger 31, absorbing 29 MW; and 14935 MPH in heat exchanger 13, absorbing 26 MW. 3190 MPH of superheated steam is supplied to the primary reformer, and the balance, 28405 MPH, is expanded from 117 bars to 31 bars and 630° K. through 23,500 hp turbo-expander 32, then combined with 2355 MPH additional 31 bar steam from medium pressure steam heat exchanger 19, and then introduced into the oxidizer via heat exchanger 16 and means for injection 4.

The medium pressure steam system, additionally including condensing turbine 33, condenser 34, and feed pump 35, can either export or import steam from the remainder of the process, depending on heat availability and mechanical power needs. In this embodiment it is shown as exporting 2985 MPH of steam, 2355 MPH to the oxidizer and 630 MPH to the secondary reformer. As a total of 3650 MPH of medium pressure steam is generated, 665 MPH remains for the turbine, which develops 600 hp expanding and condensing the steam to 4 in. Hg. 2985 MPH makeup feed is required to compensate for the exported steam.

TABLE OF GAS COMPOSITION

| Location | A | | B | | C | |
|---|---|---|---|---|---|---|
| Species | MPH | % | MPH | % | MPH | % |
| $CH_4$ | 1441 | 14.6 | 63 | 0.4 | 0 | 0 |
| $H_2O$ | 1190 | 12.0 | 2165 | 12.9 | 7796 | 44.9 |
| $H_2$ | 5495 | 55.6 | 7910 | 47.3 | 2750 | 15.8 |
| $CO_2$ | 250 | 2.5 | 368 | 2.2 | 2365 | 13.6 |
| CO | 1500 | 15.2 | 2760 | 16.5 | 827 | 4.8 |
| $N_2$ | 0 | 0 | 3427 | 20.5 | 3542 | 20.4 |
| Inerts | 0 | 0 | 31 | 0.2 | 71 | 0.4 |
| Total | 9876 | 100 | 16724 | 100 | 17351 | 100 |

The combined hydrogen and nitrogen streams are compressed to synthesis loop pressure and combined with synthesis loop recycle gas in 15,000 hp compressor 37. 375 MPH of purge gas containing 30 MPH of inerts is reduced in pressure by means for pressure reduction 38, and added to the reducing gas. 4893 MPH of liquid $NH_3$ product containing 125 MPH gas is withdrawn from the synthesis loop and reduced in pressure to a pressure approximately 1 bar greater than reducing gas pressure by means for pressure reduction 39, whereby most of the dissolved gases flash out of solution. Separator 40 directs the flash gases into the reducing gas and yields the resulting degasified liquid $NH_3$ product.

When supplemental energy is needed for the primary reformer, introducing it by means of gas turbine 9 as shown on the flow sheet yields a slightly greater amount of mechanical power than if the fuel is introduced directly and mechanical power is derived only from the extra steam which is generated. The 100 MPH of $CH_4$ supplied to fuel the gas turbine is approximately 10 MW of heating value, and can be supplied by any other suitable carbonaceous fuel. Approximately 25% of the heating value is realized as mechanical energy (3000 hp), with the remainder being delivered to the reformer as thermal energy of the hot exhaust products plus excess air.

A total of 43,100 hp is shown being generated, driving compressors totaling 30,900 hp. The remaining horsepower drives equipment not shown: refrigeration compressor, feed pumps, induced draft fan, cooling water pumps, $CO_2$ absorber solution pump, etc.

The net feedstock requirement is 3290 MPH. The best current practice ammonia plant designs require approximately 3700 MPH, corresponding to 31,700 scf of natural gas per ton of $NH_3$. Thus this embodiment reflects an 11% reduction in feedstock requirements. If pure hydrogen is the product rather than ammonia synthesis gas, the 26 MW of heat from the ammonia synthesis loop is not available, but that is compensated for by substantially reduced horsepower requirements, making the same order of magnitude improvement possible.

Many modifications to the flow sheet are possible within the spirit of the disclosed invention. The reductor and oxidizer can be at different temperatures, changing the equilibrium conversion levels, or different intermediates can be used, including multistaging. $CO_2$ available from the scrubber can be supplied to the primary reformer. The entire waste heat energy management system can be extensively revised. Supplemental fuel can be supplied to either the primary or secondary reformer. Many of these modifications may yield an improved process in a particular set of conditions.

I claim:

1. A process for generating hydrogen which comprises a. generating the hydrogen by intermediate oxidation-reduction, wherein at least one intermediate selected from the group consisting of iron, wustite, tin, and $WO_2$ is reacted with steam to produce the hydrogen and an oxide of the intermediate, and the intermediate oxide is reacted with a reducing gas to regenerate the intermediate, whereby an exhaust reducing gas is available;

b. oxidizing at least part of said exhaust reducing gas, whereby heat is released;

c. supplying said heat to an endothermic reforming reaction between steam and a light hydrocarbon, whereby a reformed reducing gas mixture is obtained;

d. using said reformed gas mixture as a source of at least part of said reducing gas in step a.

2. The process according to claim 1, wherein said heat is supplied to said steam hydrocarbon reforming reaction by indirect heat exchange through the catalyst containing tubes of a steam reformer.

3. The process according to claim 1 wherein $CO_2$ is supplied in addition to steam and hydrocarbon as a reactant in the endothermic steam-hydrocarbon reforming reaction.

4. The process according to claim 1 wherein the reformed gas mixture is partially oxidized by a free oxygen containing gas prior to being used as the reducing gas.

5. The process according to claim 1 wherein said reformed gas mixture plus a free oxygen containing gas are contacted directly with the intermediate oxide, whereby partial oxidation of the reformed gas mixture and reduction of intermediate oxide occur concurrently.

6. The process according to claim 4 wherein carbonaceous fuel is added to said reformed gas mixture.

7. The process according to claim 1 wherein at least part of the steam supply to be reacted with at least one intermediate is generated at a pressure of approximately 120 bars using waste heat from the process, and is then expanded through a turbo-expander to the approximate pressure of the intermediate, whereby mechanical energy is recovered from the waste heat.

8. The process according to claim 1 wherein at least one of the metal or metallic compounds is iron, wustite, $WO_2$, or tin.

9. The process according to claim 1 wherein at least one of the metal or metallic compounds is tungsten dioxide, tungsten, or molybdenum.

10. The process according to claim 1 wherein at least one of the intermediates consists essentially of liquid tin at a temperature in the approximate range of 900° K. to 1250° K. and a pressure in the approximate range of 5 bars to 180 bars.

11. In a process for producing hydrogen in which steam is reacted with at least one metal or metallic compound so as to produce hydrogen and oxidize the metal or metallic compound, and the oxidized metal or metallic compound is subsequently reduced by a reducing gas, so as to regenerate the metal or metallic compound and make available an exhaust reducing gas, the improvement which comprises: generating said reducing gas by:

a. partially reforming a light hydrocarbon with steam, thereby yielding a partially reformed gas;

b. partially oxidizing said partially reformed gas with air or oxygen; thereby generating said reducing gas c. combusting at least part of said exhaust reducing gas with air so as to supply the heat requirement of the endothermic reforming reaction of step (a).

12. The process of claim 11 in which supplemental fuel is added to the partially reformed gas which is partially oxidized in step (b).

* * * * *